United States Patent
Morelli et al.

(10) Patent No.: US 12,204,546 B2
(45) Date of Patent: Jan. 21, 2025

(54) DATA TRANSFER IN A COMPUTER-IMPLEMENTED DATABASE FROM A DATABASE EXTENSION LAYER

(71) Applicant: SAP SE, Walldorf (DE)

(72) Inventors: Canberk Morelli, Mannheim (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/945,599

(22) Filed: Sep. 15, 2022

(65) Prior Publication Data

US 2024/0095248 A1    Mar. 21, 2024

(51) Int. Cl.
*G06F 16/2455*    (2019.01)
*G06F 11/34*    (2006.01)
*G06F 16/2453*    (2019.01)

(52) U.S. Cl.
CPC .... *G06F 16/24561* (2019.01); *G06F 11/3419* (2013.01); *G06F 16/24542* (2019.01); *G06F 16/24552* (2019.01)

(58) Field of Classification Search
CPC ......... G06F 16/24561; G06F 16/24542; G06F 16/24552; G06F 11/3419
See application file for complete search history.

(56) References Cited

U.S. PATENT DOCUMENTS

| | | | | |
|---|---|---|---|---|
| 7,483,890 B2* | 1/2009 | Zhou | ...................... | G06F 16/284 |
| 7,493,890 B2* | 2/2009 | Etou | ........................ | F02D 15/00 |
| | | | | 123/406.29 |
| 7,836,065 B2* | 11/2010 | Hackmann | ............ | G06F 16/252 |
| | | | | 707/758 |
| 8,838,750 B2* | 9/2014 | Zenz | .................... | G06F 9/44505 |
| | | | | 709/219 |
| 8,868,594 B2* | 10/2014 | Baeumges | .......... | G06F 16/2457 |
| | | | | 707/718 |
| 8,918,363 B2* | 12/2014 | Naidu | ............... | G06F 16/90335 |
| | | | | 709/248 |
| 10,073,888 B1* | 9/2018 | Arye | ..................... | G06F 16/9538 |
| 10,146,834 B2* | 12/2018 | Baeumges | ........ | G06F 16/24554 |
| 10,255,316 B2* | 4/2019 | Weyerhaeuser | .... | G06F 16/2425 |
| 10,509,785 B2* | 12/2019 | Arye | ..................... | G06F 16/951 |
| 2007/0118553 A1* | 5/2007 | Zhou | ..................... | G06F 16/284 |
| | | | | 707/999.102 |

(Continued)

FOREIGN PATENT DOCUMENTS

EP    2780834    *    9/2014
EP    2780834 A1    *    9/2014

*Primary Examiner* — Daniel A Kuddus
(74) *Attorney, Agent, or Firm* — Mintz Levin Cohn Ferris Glovsky and Popeo, P.C.

(57) ABSTRACT

Described herein are systems and method for providing data transfer in a computer-implemented database from a database extension layer. A data server associated with a database receives a request to transfer data stored in a database extension layer of the database. Input data chunks are collected from the database extension layer until a configured row count limit is reached. Row positions are determined from the input data chunks. Value identifiers corresponding to the row positions are determined. Values corresponding to the value identifiers are retrieved. Output data is generated based on the values corresponding to the value identifiers.

18 Claims, 6 Drawing Sheets

(56) References Cited

U.S. PATENT DOCUMENTS

| | | | | |
|---|---|---|---|---|
| 2012/0016901 A1* | 1/2012 | Agarwal | ............... | G06F 16/258 |
| | | | | 707/769 |
| 2013/0166589 A1* | 6/2013 | Baeumges | ........ | G06F 16/24532 |
| | | | | 707/769 |
| 2013/0282746 A1* | 10/2013 | Balko | .................... | G06Q 10/06 |
| | | | | 707/E17.014 |
| 2013/0304707 A1* | 11/2013 | Herbst | .................. | G06F 16/252 |
| | | | | 707/667 |
| 2015/0039588 A1* | 2/2015 | Baeumges | .......... | G06F 16/2457 |
| | | | | 707/718 |
| 2017/0139982 A1* | 5/2017 | Weyerhaeuser | .... | G06F 16/2425 |
| 2018/0150517 A1* | 5/2018 | Merker | ............. | G06F 16/24542 |
| 2018/0210926 A1* | 7/2018 | Schulze | ................ | G06F 16/258 |
| 2018/0246934 A1* | 8/2018 | Arye | ................... | G06F 16/2264 |
| 2018/0246950 A1* | 8/2018 | Arye | ..................... | G06F 16/951 |
| 2018/0349424 A1* | 12/2018 | Gurajada | .............. | G06F 3/0604 |
| 2019/0188204 A1* | 6/2019 | Arye | ...................... | G06F 16/27 |
| 2020/0334254 A1* | 10/2020 | Arye | .................. | G06F 16/2393 |
| 2021/0034586 A1* | 2/2021 | Arye | ................ | G06F 16/24539 |
| 2021/0034598 A1* | 2/2021 | Arye | ..................... | G06F 16/288 |

* cited by examiner

DATA TRANSFER IN A COMPUTER-IMPLEMENTED DATABASE FROM A DATABASE EXTENSION LAYER

This disclosure relates generally to data processing and, in particular, to data transfer in a computer-implemented database from a database extension layer.

BACKGROUND

Data retrieval from multiple database systems has become a frequent process for many computer systems. For example, some systems handle hundreds if not thousands of data transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

Systems, methods, and articles of manufacture, including computer program products, are provided for transferring data in a computer-implemented database from a database extension layer. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method includes receiving, by one or more processors at a data server associated with a database, a request to transfer data stored in a database extension layer of the database, collecting, by the one or more processors, input data chunks from the database extension layer until a configured row count limit is reached, determining, by the one or more processors, row positions from the input data chunks, determining, by the one or more processors, value identifiers corresponding to the row positions, retrieving, by the one or more processors, values corresponding to the value identifiers, and generating, by the one or more processors, output data based on the values corresponding to the value identifiers.

In some variations, one or more features disclosed herein including the following features can optionally be included in any feasible combination. Determining the value identifiers can include sorting the row positions using a sequential access pattern. The computer-implemented method can include sorting, by the one or more processors, the value identifiers to generate sorted value identifiers that are unique and mapping the sorted value identifiers to respective rows. Determining the values identifiers can include sorting the value identifiers using a sequential identifier access pattern. The input data chunks can include the row positions of a corresponding table of a column-oriented database. Each of the value identifiers can include an index of a dictionary of a column of the corresponding table. The request can be received from a client machine can include a computing system used by a user issuing the request for data transfer.

Another general aspect includes a system that includes at least one programmable processor. The system also includes a non-transitory machine-readable medium storing instructions that, when executed by the at least one programmable processor, cause the at least one programmable processor to perform operations that include: receiving, at a data server associated with a database, a request to transfer data stored in a database extension layer of the database, collecting input data chunks from the database extension layer until a configured row count limit is reached, determining row positions from the input data chunks, determining value identifiers corresponding to the row positions, retrieving values corresponding to the value identifiers, and generate output data based on the values corresponding to the value identifiers.

Another general aspect includes a computer program product can include a non-transitory machine-readable medium storing instructions to perform operations that include: receiving, at a data server associated with a database, a request to transfer data stored in a database extension layer of the database, collecting input data chunks from the database extension layer until a configured row count limit is reached, determining row positions from the input data chunks, determining value identifiers corresponding to the row positions, retrieving values corresponding to the value identifiers, and generate output data based on the values corresponding to the value identifiers.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
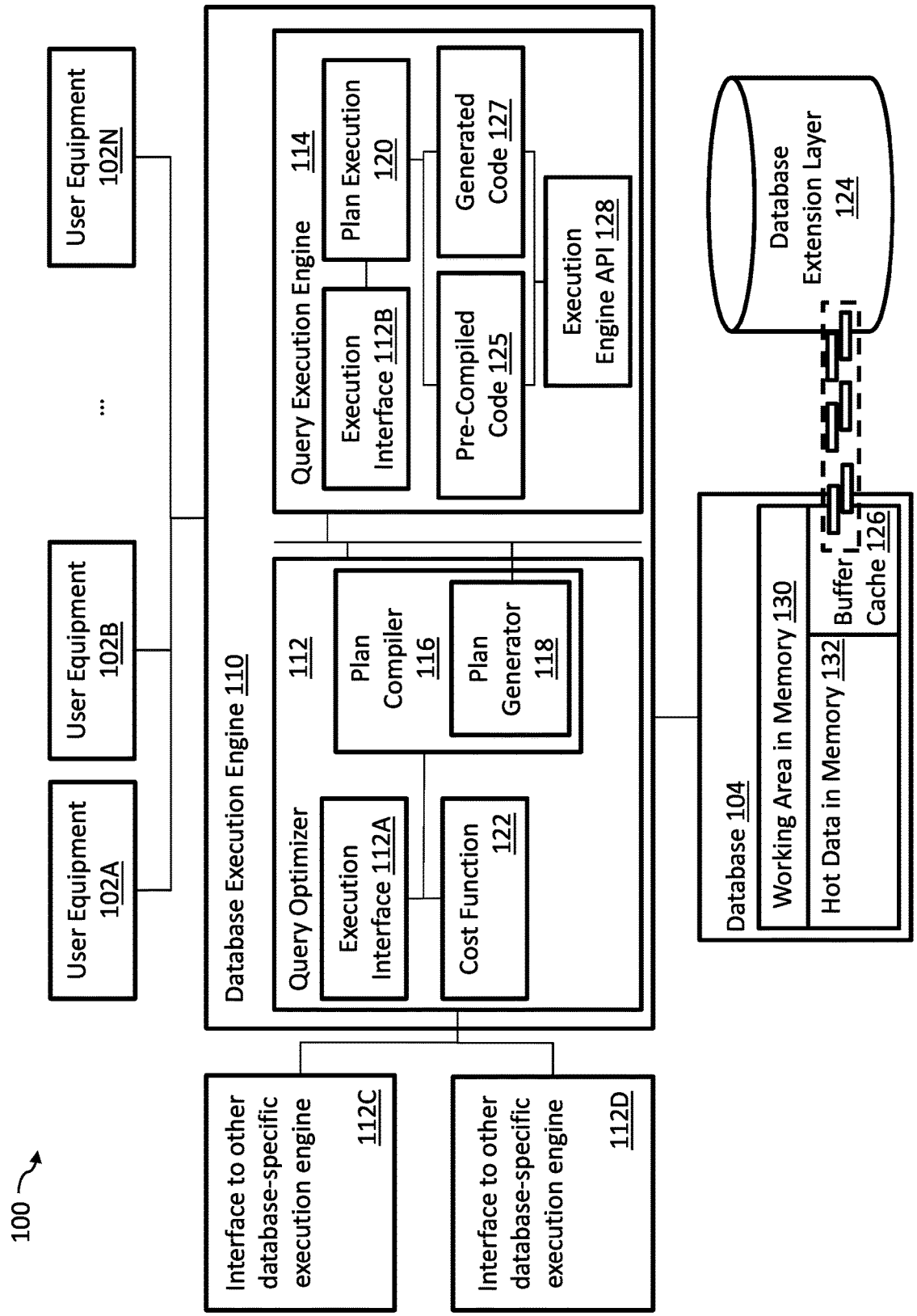
FIG. 1 illustrates an example of system, according to some implementations of the current subject matter.

The present disclosure describes various tools and techniques providing data transfer in a computer-implemented database from a database extension layer. Accessing and retrieving data from the database extension layer raises multiple limitations. The data access and transfer limitations are unique to the database extension layer and do not exist in the case of data transfers from a full in-memory database. For example, the database extension layer is associated to limited disk accesses and a limited buffer cache in memory. The limitations associated to database extension layer make page loading from the database extension layer more expensive. To address these limitations and potentially other deficiencies of currently available solutions, one or more implementations of the current subject matter relate to methods, systems, articles of manufacture, and the like that can, among other possible advantages, provide minimized page loads, which increases the performance of data transfer from the database extension layer.

In current systems, database management systems and operations performed on the data managed by a database management system have become increasingly complex. For example, a database management system (or database for short) can support relatively complex online analytical processing (OLAP), which can perform multi-dimensional analysis to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access data from a database including database extension layers. For example, the application layer in this example would need to be configured to handle the various types of databases, associated database extension layers, and the various query types. Additionally or alternatively, each database may need to process queries from the application into a format and structure that can be handled by the respective database with associated database extension layers. Pushing complex operations and support for a variety of different database types to the application layer may contravene the need to have relatively lighter weight and/or readily deployable applications. On the other hand, pushing complex operations to the database extension layer where less-frequently accessed data is stored may draw processing and/or memory resources at the database and may thus reduce the performance and response times for queries on that database extension layer.

In some example implementations, an execution engine may be provided to decouple the higher-level, application layer from the database extension layer (e.g., the persistence and/or storage layer where data including database tables may be stored and/or queried using instructions, such as commands and/or the like). The execution engine may be implemented separately from the database extension layer and/or the application layer. Further, the execution engine may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan. The executable code may be configured to optimize sequential access and to avoid duplicate lookups by including operations such as collecting input data chunks from a previous operation in the query that might (or might not) have read the data from the database extension layer (disk-based storage) until a configured row count limit is reached, grouping the collected input data chunks to transfer in bulk each data group, sorting row positions, for each corresponding table, during data group transfer, and sorting value identifiers for each column of the table during the data group transfer. Optimization of sequential access and avoidance of duplicate lookups can results in less page loads and improved system performance.

FIG. 1 illustrates an example of system 100, according to some implementations of the current subject matter. The system 100 may include one or more user equipment 102A-N, such as a computer, a smart phone, a tablet, an Internet of Things (IoT) device, and/or other computer or processor-based devices. The user equipment 102A-N may include a user interface, such as a browser or other application to enable access to one or more applications, databases 104, and/or database extension layer(s) 106, to generate queries to one or more databases 104, and/or to receive responses to those queries.

In the example of FIG. 1, the database 104 enables management of the database external layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 110 to the database layer 104, which may represent a persistence and/or storage layer where database tables may be stored and/or queried. The query may be sent via a connection, such as a wired and/or wireless connection (e.g., the Internet, cellular links, WiFi links, and/or the like). The database 104 includes a working area in memory 130, a hot data in memory 132 and a buffer cache 126. The hot data in memory 132 stores mission-critical data for real-time processing and analytics and retains hot data continuously in memory for fast performance, being located in the highest performance storage. The buffer cache 126 manages memory pages in the database extension layer 124 that is connected to the database 104 through disk-based integration or flash-drive based database technology. The capacity of the working area in memory 130 of the database 104 with the database extension layer 124 is the amount of hot data in memory 132 plus the amount of warm data or cold data on the database extension layer 124. In some implementations, at least a portion of the data stored by the database extension layer 124 is stored in a non-sequential pattern, where data sets have no order.

The database execution engine 110 may include a query optimizer 112, such as a SQL optimizer and/or another type of optimizer, to receive at least one query from a user equipment and generate a query plan (which may be optimized) for execution by the execution engine 114. The query optimizer 112 may receive a request, such as a query, and then form or propose an optimized query plan. The query plan (which may be optimized) may be represented as a so-called "query algebra" or "relational algebra."

For example, a query received by the database execution engine 110 including the query optimizer 112 can include: SELECT Columns from Table A and Table B stored by the database extension layer, and perform an INNER JOIN on Tables A and B. Several ways of implementing execution of this query can exist. As such, the query plan may offer hints or propose an optimum query plan with respect to the execution time of the overall query. To optimize a query, the query plan optimizer 112 may obtain one or more costs for the different ways the execution of the query plan can be performed. The costs may be obtained via the execution interface 112A from a cost function 122, which responds to the query optimizer 112 with the cost(s) for a given query plan (or portion thereof), and these costs may be in terms of execution time at the database extension layer 124, for example. For example, the cost function 122 can be used to find an optimal row count limit for retrieving input data chunks from the database extension layer, based on one or more of table sizes, processing capability (e.g., memory), and system characteristics (e.g., characteristics of a buffer cache 126).

The query optimizer 112 may form an optimum query plan, which may represent a query algebra, as noted above. To compile a query plan, the query optimizer 112 may provide the query plan to the query plan compiler 116 to enable compilation of some, if not all, of the query plan. The query plan compiler 116 may compile the optimized query algebra into operations, such as a program code and/or any other type of command, operation, object, or instruction. The program code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 114.

In some implementations, the query optimizer 112 may optimize the query plan by compiling and generating code. Moreover, the query optimizer 112 may optimize the query plan to enable pipelining during execution. In some implementations, the query optimizer 112 may be configured to select other execution engines. For example, the query optimizer 112 may select via interface 112C an execution engine configured specifically to support a row-store database or an Advanced Business Application Programming (ABAP) type database, or the query optimizer 112 may select via interface 112D an execution engine configured specifically to support a column-store type database. In this way, the query optimizer 112 may select whether to use the universal database execution engine 110 or legacy (e.g., database-specific) execution engines (available via interfaces 112C/D, for example).

The query execution engine 114 may receive, from the plan generator 118, compiled code to enable execution of the optimized query plan, although the query execution engine may also receive code or other commands directly from a higher-level application or other device, such as user equipment 102A-N. The query execution engine 114 may forward, via an execution interface 112B, the code to a plan execution engine 120. The plan execution engine may prepare the plan for execution, and this query plan may include pre-compiled code 125 and/or generated code 127. When the code for the query plan is ready for execution during runtime, the query execution engine 114 may step through the code performing some of the operations within the database execution engine 110 and sending some of the operations (or commands in support of an operation, such as a read, write, and/or the like) to the execution engine application programming interface (API) 128 for execution at one or more of databases extension layers 124.

In some implementations, the query execution engine 114 may, as noted, be configured to handle different types of databases and corresponding extension (persistent and/or storage) layers 124 and/or tables therein. For example, the database 104 may be implemented as a row-oriented database, so that an insert is performed by adding a row with a corresponding row identifier, while another database 104 may be implemented as a column store database, which may use dictionaries and compressive techniques when inserting data into a table. In this example, the query execution engine 114 may perform execution related to handling the differences between these two types of databases. This may enable a reduction in processing at the database extension layer 124. Moreover, the query execution engine 114 may perform other operations including rule-based operations, such as joins and projections, as well as filtering, group by, multidimensional analysis, and/or the like to reduce the processing burden on the database layer. In this way, the query execution engine 114 may execute these and other complex operations, while the database extension layer 124 can perform simpler operations to reduce the processing burden at the database extension layer 124.

In some example implementations, the query execution engine 114 may run, as noted above, just-in-time code 127 generated for some query operations, while pre-compiled code 125 may be run for other operations. Moreover, the query execution engine 114 may combine the generated code 127 with pre-compiled code 125 to further optimize execution of query related operations. In addition, the query execution engine 114 may provide for a plan execution framework that is able to handle data chunk(s), pipelining, and state management during query execution.

In some implementations, the query execution engine may be configured to generate a push model pipeline-based executable plan from a global SQL optimizer plan and then trigger execution of pipeline to obtain a result of the query. The current subject matter's query execution engine may be configured to generate result rows as soon as the data is obtained from a database 104 and/or database extension layer 124. To support query execution involving more than one data location for the execution engine in a scaled-out computing system (e.g., such as HANA HEX computing system, as described below and available from SAP SE, Walldorf, Germany), the current subject matter may be configured to execute a distributed query processing generating a pipeline-based distributed query executable plan and then triggering and controlling execution of the generated distributed query executable plan to transfer data from the database extension layer 124 saved a column-oriented database (also referred to as a column-store database).

The values in the columns of the column-oriented database may be compressed using a dictionary. As the values in a column may be of a similar type (e.g., a column of cites, a column of countries, a column of amounts), the dictionary may provide meaningful compression, when compared to row-oriented database where the values in a row can be dissimilar. A data vector can represent the values encoded using the dictionary and then stored in the database extension layer 124 as a column-oriented database. Each column of the database extension layer 124 can be stored as the data vector. An inverted index can map each value ID to a list of row IDs (which represent row positions) in the data vector that contain the value ID. The phrase "domain-coded" refers to whether the values in the column are substituted by the value IDs from a dictionary. The values can be identified with value IDs in domain coding, the computation of a sorted sequence of domain-coded values is another way of saying the computation of a sorted sequence of value IDs. The dictionary can be sorted or ordered according to a given criterion (or criteria), such as case-sensitive collation (e.g., A, B, C, a, b, c, etc.) or case-insensitive collation (A, a, B, b, C, c, etc.). In some embodiments, the type of sort collation of the SQL query should match the sort collation of the dictionary. The sort collation of the SQL query and the dictionary may match if sort collation was not explicitly specified in SQL, but the dictionary values happen to be implicitly sorted according SQLs default collation (e.g., which may be for example case sensitive). In some databases, this might be the case if the dictionary values consist of only lower-case characters (e.g. 'bdb', 'edw', 'fdd', ... ), only upper-case characters (e.g. 'CMA', 'GER', 'ME', ... ), or of only numeric characters ('4256', '674', '901', ... ), for example.

Alternatively, or additionally, the sort collation of the SQL query and the dictionary may match if the sort collation was explicitly specified in SQL and the specified collation is the same (e.g., equals) as the collation of the dictionary (e.g., ORDER BY . . . LOCALE "CASE_INSENSITIVE"). This may occur quite often in practice, for example when (1) sorting was requested in SQL only to provide results in an unambiguous manner and/or when (2) one is only interested in chunks (e.g., a windows of N consecutive sorted rows) rather than in all sorted rows of a column. The former (1) implies that an arbitrary sort criterion is chosen (e.g., case-insensitive collation which is the dictionary default collation), and the latter (2) enables omitting the expensive internal sorting step in accordance with some embodiments.

Figure 2:
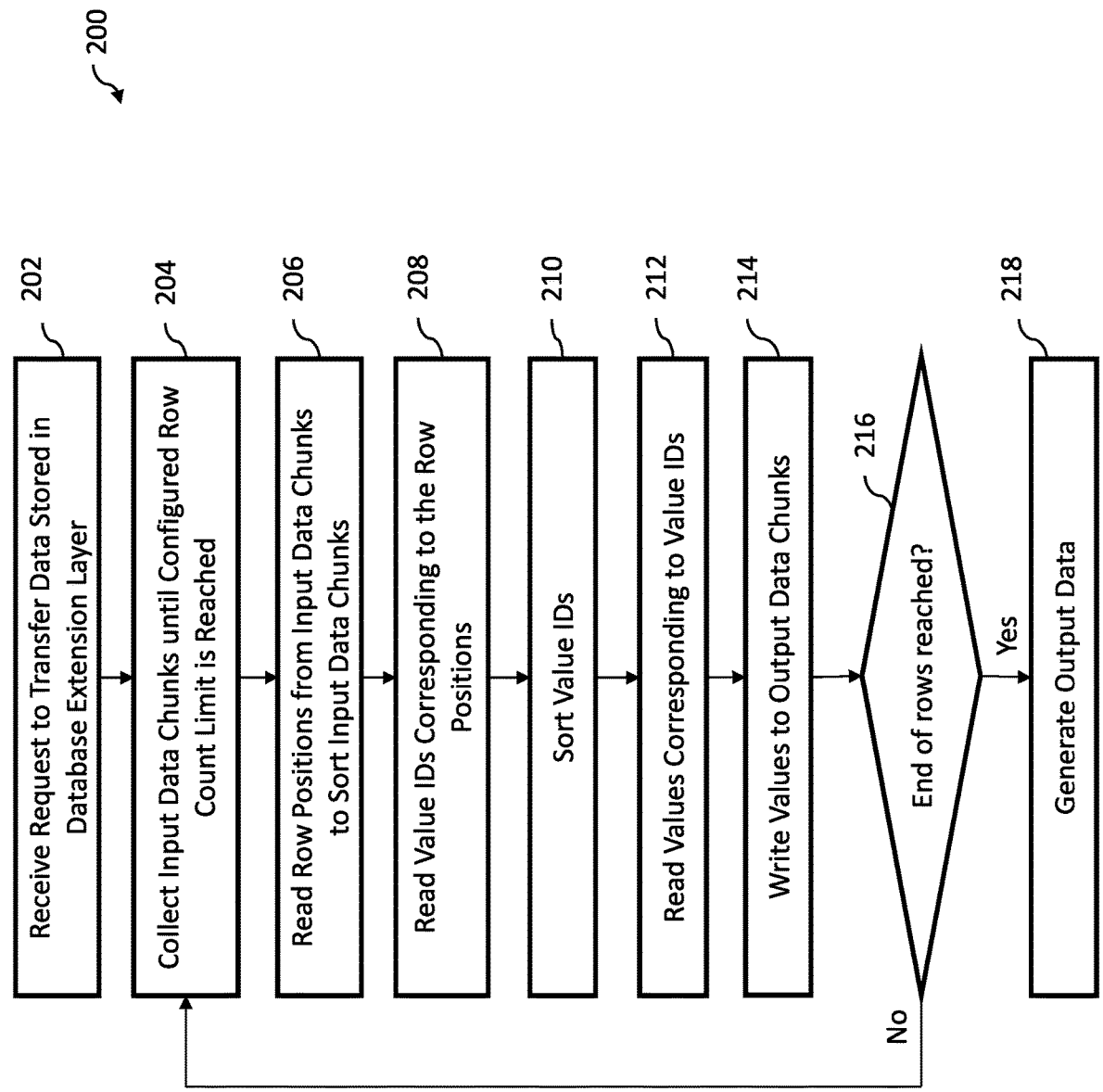
FIG. 2 illustrates an example of process for data transfer in a computer-implemented database from a database extension layer, according to some implementations of the current subject matter.

FIG. 2 illustrates an example of process 200 for transferring data from the database extension layer, according to some implementations of the current subject matter. The process 200 may be performed by one or more components of the systems shown in any of FIGS. 1, 4, 5, and 6.

At 202, a query, including a request to transfer data stored within one or more pages (tables) in a database extension layer of the database, as a non-sequential pattern, is received. The query can include an original query that was optimized. The original query can be received from a user equipment. The original query can be processed, by a query optimizer, to determine an optimized query plan, to optimize the transfer of the data from the one or more pages in the database extension layer of the database. In some implementations, the original query is optimized, by the query plan optimizer, based on one or more costs associated to different ways the execution of the query plan can be performed. The costs may be obtained via the execution interface from a cost function, which responds to the query optimizer with the cost(s) for a given query plan (or portion thereof), and these costs may be ranked in terms of execution time at the database extension layer, for example. The optimized query plan can include an optimal row count limit determined based on one or more of pages characteristics, sizes of the one or more pages identified for data transfer, processing capability (e.g., working area memory), and system characteristics (e.g., characteristics of a buffer cache that manages memory pages in the database extension layer). For example, page characteristics are considered such that if a page includes sparse rows that are far from each other, the row count limit is large enough to include one or more non-NULL values, but the row count limit is smaller than a set threshold associated with a processing benefit of a pipeline-based distributed query executable plan. The page size can be used as a factor of proportionality between the row count limit and the page size, such that blocks are larger for larger pages and smaller for smaller pages.

At 204, a data block including input data chunks are collected from a previous operator in a query that might read data from the database extension layer until a determined row count limit is reached. The input data chunks include a set of row positions of a corresponding table of the page of the database extension layer.

At 206, row positions are read, by a materialization operator, from the input data chunks to process (sort and uniquify by eliminating duplicates) the input data chunks and to generate output data chunks. Each row position is unique in the target table that they refer to. In the incoming data chunks, a row position may appear multiple times. The input data chunks are mapped to output chunks considering the order of the original page format in the database extension layer. The mapping can enable generation of output data with matching row order by using a reference to the original row position. For example, the following input chunks #1 and 2 can be processed to generate column "A", yielding the following output chunks #1 and #2 as a result with Row-Position|A.

| Input Chunk #1 Row Positions | Input Chunk #2 Row Positions |
| --- | --- |
| 5 | 18 |
| 8 | 7 |
| 18 | |
| 8 | |

The materialization operator can process the example input chunks #1 and #2 to generate output chunk #1

| Output Chunk #1 Row Position \| A | | Output Chunk #2 Row Position \| A | |
| --- | --- | --- | --- |
| 5 | X | 18 | Z |
| 8 | Y | 7 | X |
| 18 | Z | | |
| 8 | Y | | |

When the row positions of the input chunks are processed (sorted and/or duplicates are eliminated), the output data includes a series with unique entries, such as, for the context example: (5, 7, 8, 18). The mapping associates the output row position (e.g., for the context example "18") to the input row position, which in the context example appeared in ("Input chunk #1/Row 3", "Input chunk #2/Row 1"). For example, after reading the value for 18 (="Z") the mapping is used to write the read value (e.g., 18) into the correct position(s) of the output chunks.

The row positions can be sorted using a sequential access pattern based on a chosen sorting (ascending or descending) method to generate a sequence of sorted row positions. The process of sorting the row positions can include identification of duplicate rows in the query plan. The identified duplicate sorted rows can be eliminated to optimize the query plan.

At 208, for each field of an output table that needs to be generated, the value identifiers (IDs) corresponding to the sorted row positions in the data vector are read. Given that row positions are unique, a minimum number of reads of value IDs is done. The sorted row positions enable sequential access to the data vector. Each value ID includes an index of a dictionary of a column of the corresponding table.

At 210, the value IDs are sorted using a chosen sorting (ascending or descending) method to make them unique. The sorting of the value IDs can be used to identify duplicate value identifiers. The identified duplicate value IDs can be eliminated to reduce a number of steps of the optimized query plan. The sorted (and filtered) value identifiers are mapped to respective input row.

At 212, for each field of an output table that needs to be generated, the values corresponding to the sorted (and filtered) value IDs are read from a respective dictionary. The process of reading the values is optimized because a minimum number of reads is done given that the sorted (and filtered) value IDs are unique. The sorted row positions enable sequential access to the data on the database extension layer (connected external disk).

At 214, the values are written to output data chunks. At 216, it is determined if all rows of the one or more tables identified for data transfer were read. If not all the rows were read, the process 200 proceed to collecting an additional data block including input data chunks that are collected from the one or more tables of the database extension layer until a configured row count limit is reached. If all rows of the one or more tables identified for data transfer were read, at 218 the output data chunks are processed to generate the output data. In some implementations, generating the output data includes transmitting data by coordinating pushing of data from data transmission location to data receiving location through a network between plan fragments to a user equipment that initiated the request for the data from the database extension layer.

Figure 3:
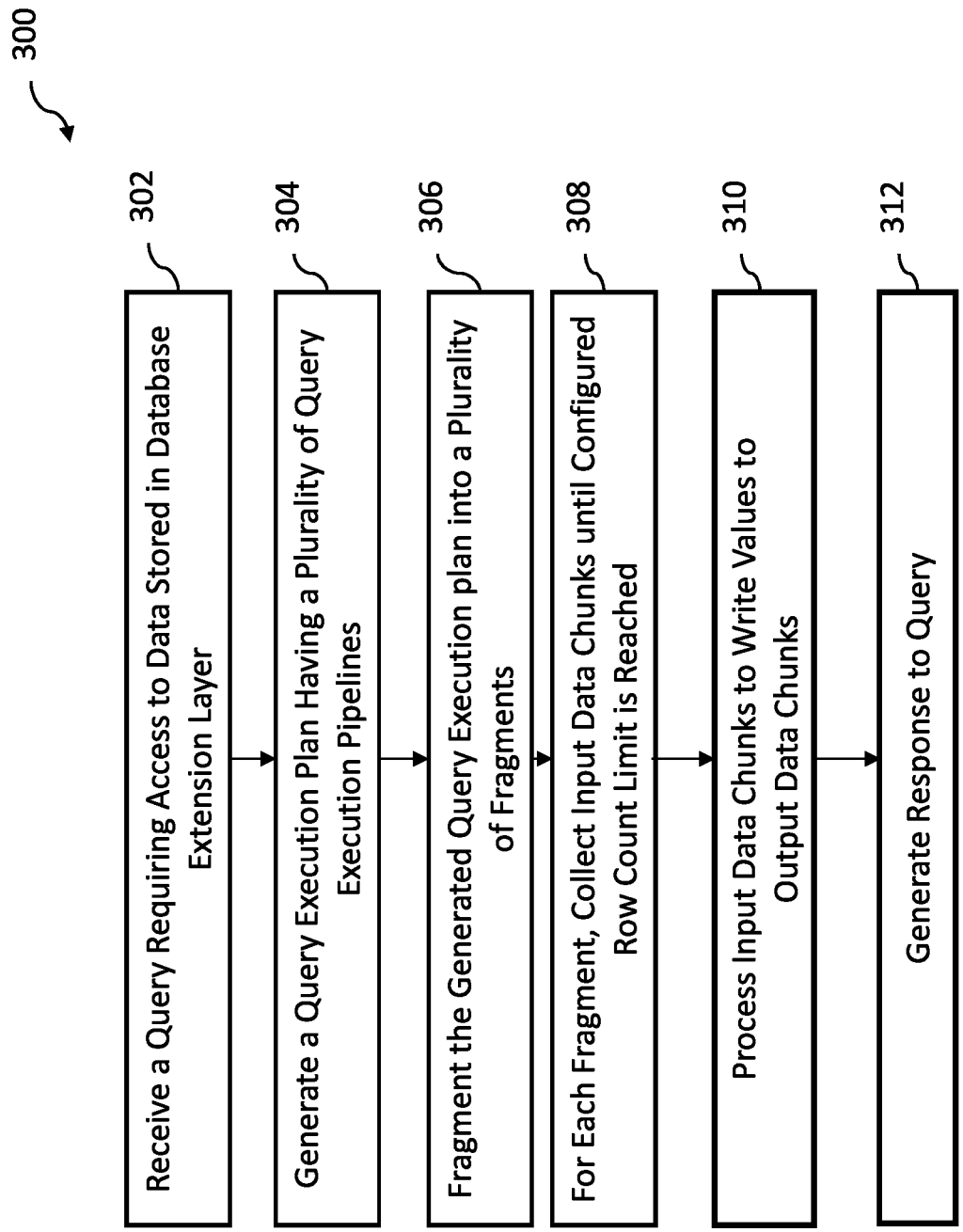
FIG. 3 is another example of process, according to some implementations of the current subject matter.

FIG. 3 illustrates an example of method 300 for generating a query executable plan, according to some implementations of the current subject matter. At 302, a query requiring access to data stored in a database extension layer may be received. For example, the query may be received by the systems shown in any of FIGS. 1, 4, 5, and 6.

At 304, using the received query, a query execution plan may be generated. The plan may include a plurality of query execution pipelines. Each query execution pipeline in the plurality of query execution pipelines may be configured to execute a plurality of operations in a predetermined order associated with each query execution pipeline.

At 306, the generated query execution plan may be fragmented into a plurality of fragments. Each fragment may include one or more query execution pipelines in the plurality of query execution pipelines. A pipeline may be configured to correspond to table processes and may be configured to start with a scan or read operator. The results of the pipelines may be joined using a join operator and passed along to a root node operator.

At 308, for each fragment in the plurality of fragments, input data chunks are collected from the database extension layer until a determined row count limit is reached. At 310, the input data chunks are processed to generate output data chunks, as described with reference to FIG. 2.

At 312, a response to the query is generated. For example, once the output data has been received by a receiving operation's pipeline, a notification may be transmitted to the transmitting operation at the remote location that the receiving operation's pipeline has received all requested data. At that point, the system may be configured to determine whether the end of the list of the data receiving operations has been reached (i.e., all receiving operations' pipelines on the list have been executed). If so, results of the executable query plan may be generated and/or fetched.

Figure 4:
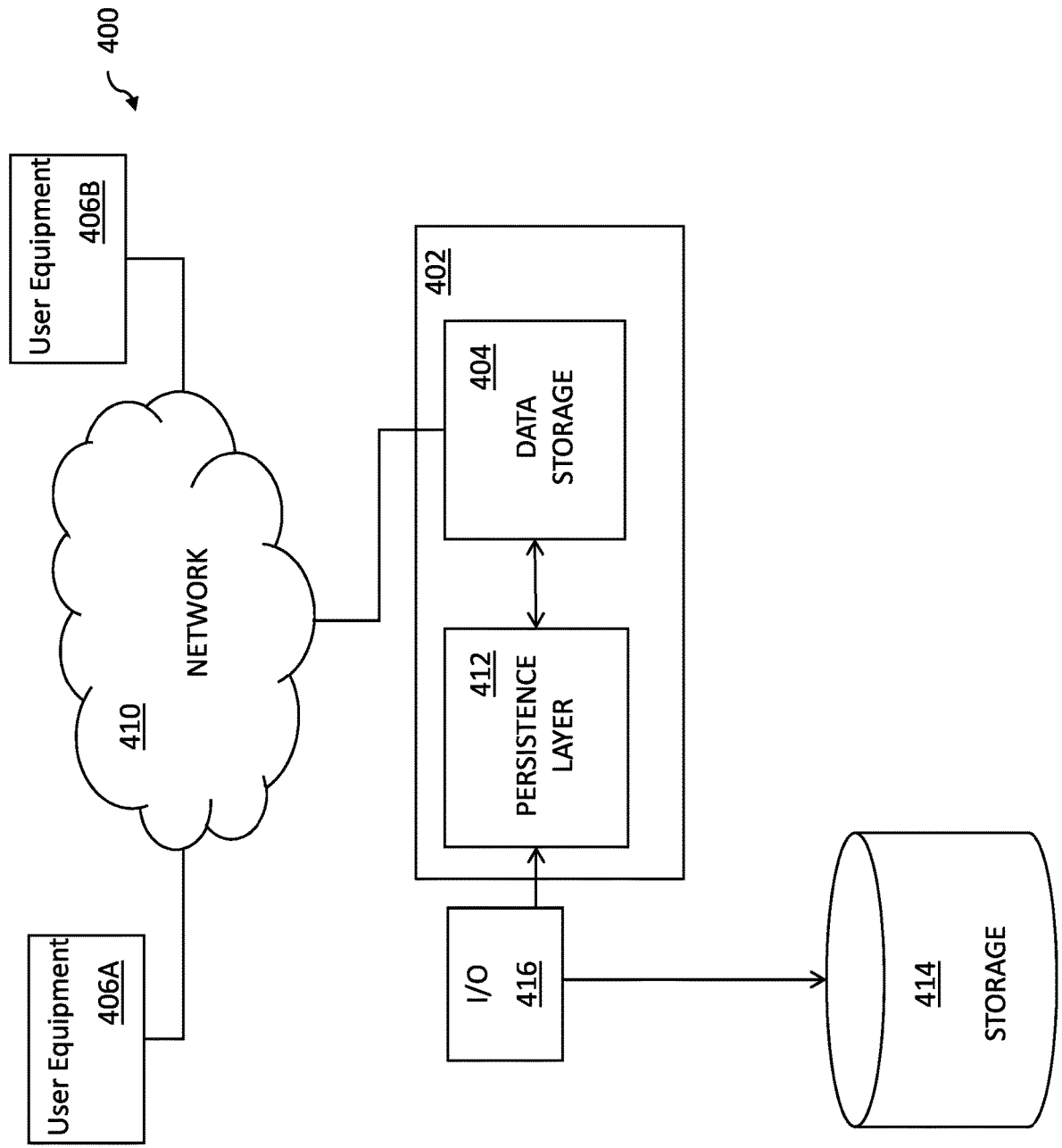
FIG. 4 is a diagram illustrating an example of system including a database extension layer, according to some implementations of the current subject matter.

FIG. 4 illustrates another example of system 400 that can be configured to execute the processes described with reference to FIGS. 2 and 3. The system 400 includes a computing system 402, which may include one or more programmable processors. The computing system 402 may include, or may be linked over one or more networks, etc., to a data storage 404, according to some implementations of the current subject matter. The data storage 404 may include one or more of a database, an enterprise resource program, a distributed storage system (e.g. NetApp Filer available from NetApp of Sunnyvale, CA), or the like.

One or more modules or software components of the computing system 402 may be accessible to local users as well as to remote users accessing the computing system 402 from a user equipment 406A, B over a network connection 410. One or more user interface screens produced by the one or more first modules may be displayed to a user, either via a local display or via a display associated with one of the user equipment 406A, B. Data units of the data storage 404 may be transiently stored in a persistence layer 412 (e.g., a page buffer or other type of temporary persistency layer or database extension layer 124 described with reference to FIG. 1), which may write the data, in the form of storage pages, to one or more storages 414, for example via an input/output component 416. The one or more storages 414 may include one or more physical storage media or devices (e.g. hard disk drives, persistent flash memory, random access memory, optical media, magnetic media, and the like) configured for writing data for longer term storage. It should be noted that the storage 414 and the input/output component 416 may be included in the computing system 402 despite their being shown as external to the computing system 402 in FIG. 4.

Data retained at the longer term storage 414 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 5:
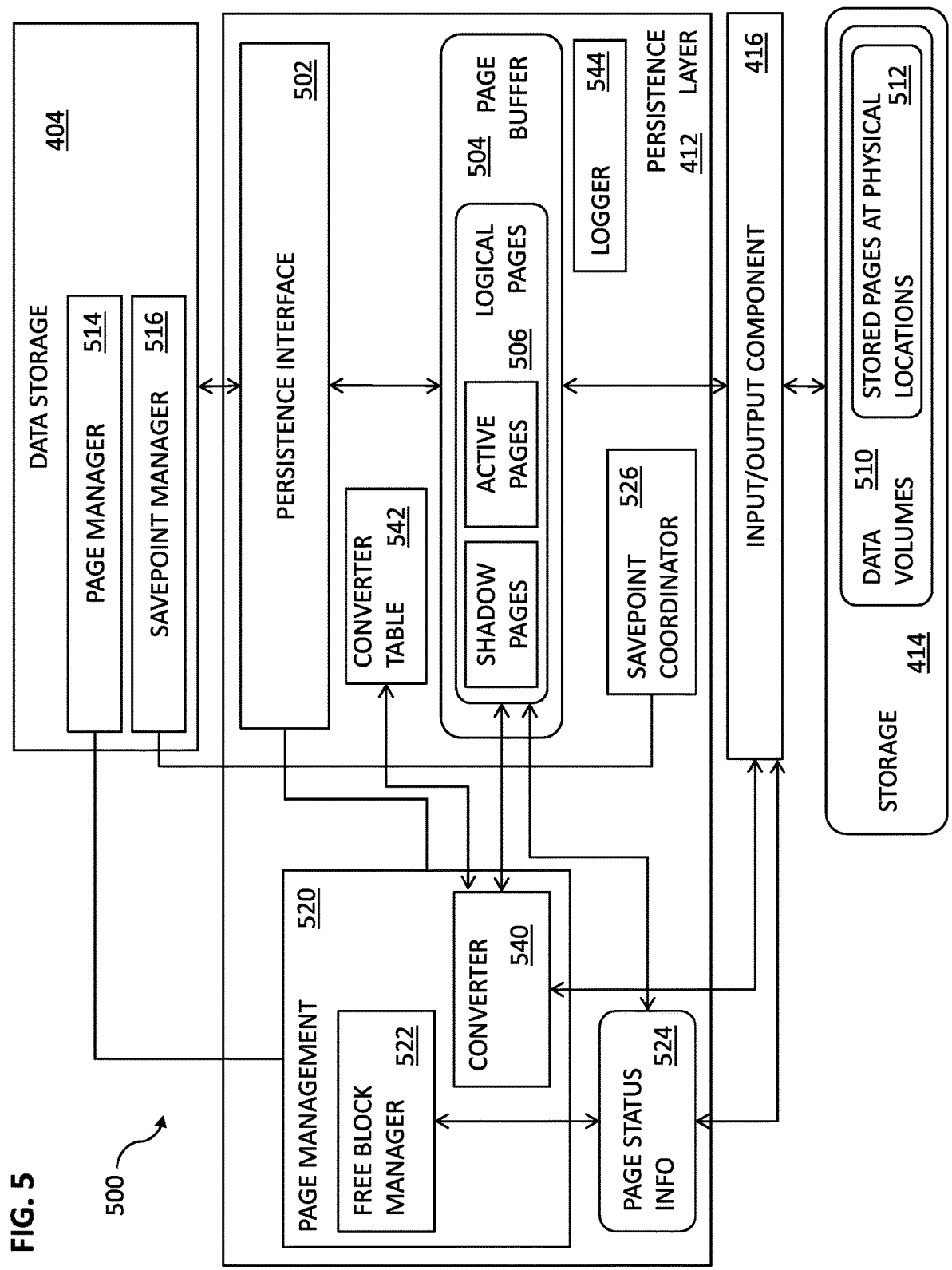
FIG. 5 is a diagram illustrating details of the system of FIG. 4.

FIG. 5 illustrates example of software architecture 500, providing details of example system 400 described with reference to FIG. 4. A data storage 404, which may be implemented in one or more of hardware and software, may include one or more of a database application, a network-attached storage system, or the like. According to at least some implementations of the current subject matter, such a data storage 404 may include or otherwise interface with a persistence layer 412 or other type of memory buffer, for example via a persistence interface 502. A page buffer 504 within the persistence layer 412 may store one or more logical pages 506, and optionally may include shadow pages, active pages, and the like. The logical pages 506 retained in the persistence layer 412 may be written to a storage (e.g. a longer term storage, etc.) 414 via an input/output component 416, which may be a software module, a sub-system implemented in one or more of software and hardware, or the like. The storage 414 may include one or more data volumes 510 where stored pages 512 are allocated at physical memory blocks.

In some implementations, the data storage 404 may include or be otherwise in communication with a page manager 514 and/or a savepoint manager 516. The page manager 514 may communicate with a page management module 520 at the persistence layer 412 that may include a free block manager 522 that monitors page status information 524, for example the status of physical pages within the storage 414 and logical pages in the persistence layer 412 (and optionally in the page buffer 504). The savepoint manager 516 may communicate with a savepoint coordinator 526 at the persistence layer 412 to handle savepoints, which are used to create a consistent persistent state of the database for restart after a possible crash.

In some implementations of a data storage 404, the page management 520 of the persistence layer 412 may implement a shadow paging. The free block manager 522 within the page management module 520 may maintain the status of physical pages. The page buffer 504 may include a fixed page status buffer that operates as discussed herein. A converter component 540, which may be part of or in communication with the page management module 520, may be responsible for mapping between logical and physical pages written to the storage 414. The converter 540 may maintain the current mapping of logical pages to the corresponding physical pages in a converter table 542. The converter 540 may maintain a current mapping of logical pages 506 to the corresponding physical pages in one or more converter tables 542. When a logical page 506 is read from storage 414, the storage page to be loaded may be looked up from the one or more converter tables 542 using the converter 540. When a logical page is written to storage 414 the first time after a savepoint, a new free physical page is assigned to the logical page. The free block manager 522 marks the new physical page as "used" and the new mapping is stored in the one or more converter tables 542.

The persistence layer 412 may ensure that changes made in the data storage 404 are durable and that the data storage 404 may be restored to a most recent committed state after a restart. Writing data to the storage 414 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 544 may also be included to store the changes made to the data of the data storage application in a linear log. The logger component 544 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 544 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 412 may use a combination of undo log entries (from one or more logs) and shadow paging.

The persistence interface 502 may handle read and write requests of stores (e.g., in-memory stores, etc.). The persistence interface 502 may also provide write methods for writing data both with logging and without logging. If the logged write operations are used, the persistence interface 502 invokes the logger 544. In addition, the logger 544 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 544. For an entry of type "update", for example, this would be the identification of the affected record and the after image of the modified data.

When a data application requesting data transfer from a database extension layer is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 544 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 544 may write a database log (or simply referred to herein as a "log") sequentially into a memory buffer in natural order (e.g., sequential order, etc.). If several physical hard disks/storage devices are used to store log data, several log partitions may be defined. Thereafter, the logger 544 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. The log buffers may be reordered from log segments of all partitions during recovery to the proper order.

As stated above, the data storage 404 may use shadow paging so that the savepoint manager 516 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 6:
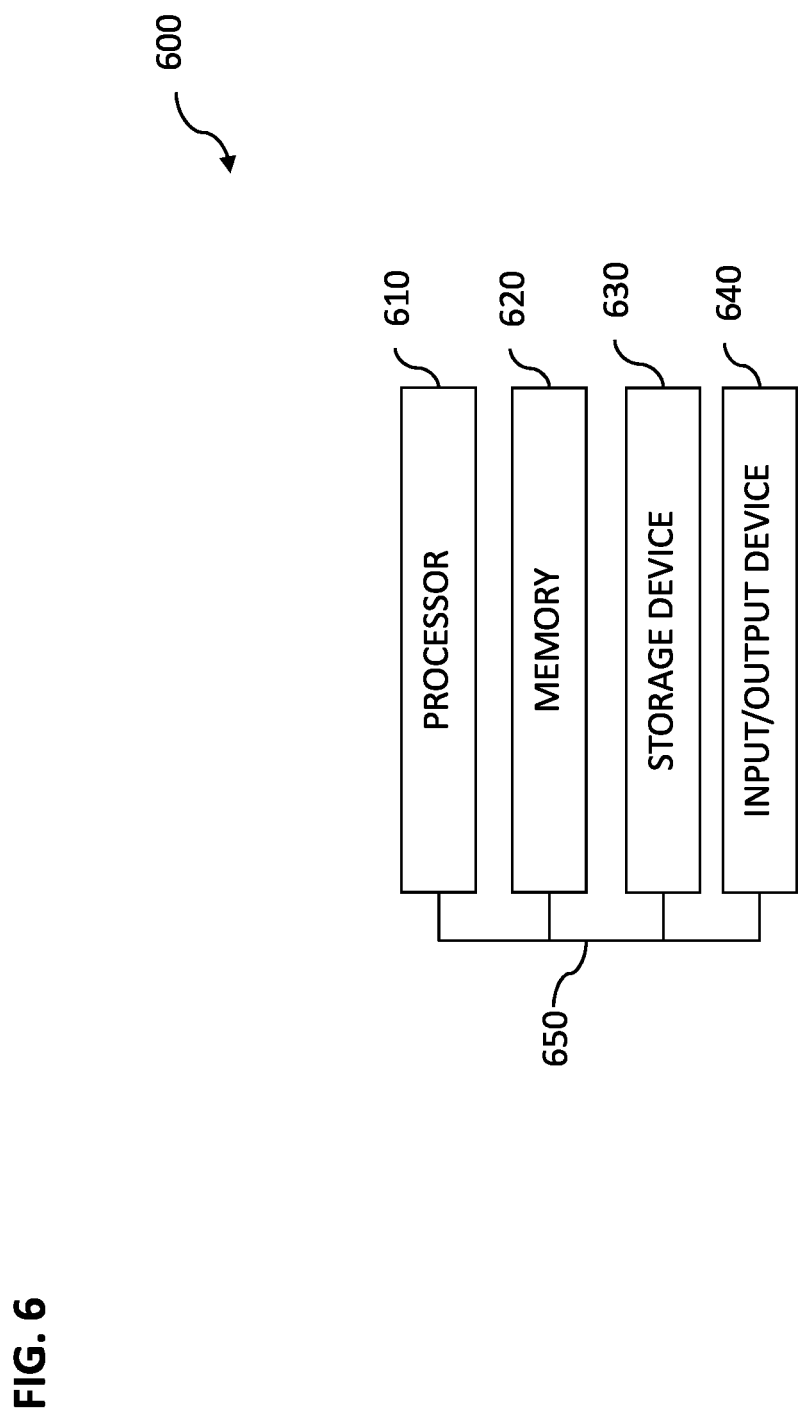
FIG. 6 is an example of system, according to some implementations of the current subject matter.

In some implementations, the current subject matter may be configured to be implemented in a system 600, as shown in FIG. 6. The system 600 may include a processor 610, a memory 620, a storage device 630, and an input/output device 640. Each of the components 610, 620, 630 and 640 may be interconnected using a system bus 650. The processor 610 may be configured to process instructions for execution within the system 600. In some implementations, the processor 610 may be a single-threaded processor. In alternate implementations, the processor 610 may be a multi-threaded processor. The processor 610 may be further configured to process instructions stored in the memory 620 or on the storage device 630, including receiving or sending information through the input/output device 640. The processor 610 may be further configured to execute the processes described with reference to FIGS. 2 and 3. The memory 620 may store information within the system 600. In some implementations, the memory 620 may be a computer-readable medium. In alternate implementations, the memory 620 may be a volatile memory unit. In yet some implementations, the memory 620 may be a non-volatile memory unit. The storage device 630 may be capable of providing mass storage for the system 600. In some implementations, the storage device 630 may be a computer-readable medium. In alternate implementations, the storage device 630 may be a floppy disk device, a hard disk device, an optical disk device, a tape device, non-volatile solid state memory, or any other type of storage device. The input/output device 640 may be configured to provide input/output operations for the system 600. In some implementations, the input/output device 640 may include a keyboard and/or pointing device. In alternate implementations, the input/output device 640 may include a display unit for displaying graphical user interfaces.

In some implementations, the current subject matter may include one or more of the following optional features. The received query may require access to the data stored in different locations in the database system. One or more locations in the database system may be considered a data consumption location and one or more other locations in the database system may be considered a data production location.

In some implementations, the plurality of fragments may include a root fragment and one or more non-root fragments. The root fragment may be configured to be executed at the data consumption location of the database system and may be further configured to receive data resulting from execution of the non-root fragments at the data production location of the database system.

In some implementations, execution of the root fragment may be configured to trigger execution of the non-root fragments. Further, execution of a query execution pipeline of the root fragment may include executing a receiving operator to receive data queried by the received query from one or more non-root fragments. Moreover, execution of a query execution pipeline of the non-root fragment may include executing a transmitting operator to transmit data queried by the received query to the root fragment. Additionally, each non-root fragment may be configured to be executed asynchronously.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method comprising:
   receiving, by one or more processors at a data server associated with a database, a request to transfer data stored in a database extension layer of the database;
   using a cost function to determine, by the one or more processors, a configured row count limit based on a corresponding table size, processing capability, and buffer cache characteristics;
   collecting, by the one or more processors, input data chunks from the database extension layer for each fragment of a plurality of fragments of a generated query execution plan until the configured row count limit is reached;
   grouping, by the one or more processors, the input data chunks into a data group to transfer in bulk the data group;
   determining, by the one or more processors, row positions from the input data chunks in the data group;
   determining, by the one or more processors, value identifiers corresponding to the row positions;
   retrieving, by the one or more processors, values corresponding to the value identifiers; and
   generating, by the one or more processors, output data based on the values corresponding to the value identifiers.

2. The method of claim 1, wherein determining the value identifiers comprises
   sorting the row positions using a sequential access pattern.

3. The method of claim 1, further comprising:
   sorting, by the one or more processors, the value identifiers to generate sorted value identifiers that are unique; and
   mapping, by the one or more processors, the sorted value identifiers to respective rows.

4. The method of claim 1, wherein determining the value identifiers
   comprises sorting the value identifiers using a sequential identifier access pattern.

5. The method of claim 1, wherein the input data chunks comprise the row
   positions of a corresponding table of a column-oriented database.

6. The method of claim 5, wherein each of the value identifiers comprises an index of a dictionary of a column of the corresponding table.

7. A system comprising:
   at least one programmable processor; and
   a non-transitory machine-readable medium storing instructions that, when executed by the at least one programmable processor, cause the at least one programmable processor to perform operations comprising:
      receiving, at a data server associated with a database, a request to transfer data stored in a database extension layer of the database;
      using a cost function to determine a configured row count limit based on a corresponding table size, processing capability, and buffer cache characteristics;
      collecting input data chunks from the database extension layer for each fragment of a plurality of fragments of a generated query execution plan until the configured row count limit is reached;
      grouping the input data chunks into a data group to transfer in bulk the data group;
      determining row positions from the input data chunks in the data group;
      determining value identifiers corresponding to the row positions;
      retrieving values corresponding to the value identifiers; and
      generating output data based on the values corresponding to the value identifiers.

8. The system of claim 7, wherein determining the value identifiers comprises sorting the row positions using a sequential access pattern.

9. The system of claim 7, wherein the operations further comprise:

sorting the value identifiers to generate sorted value identifiers that are unique; and mapping the sorted value identifiers to respective rows.

10. The system of claim 7, wherein determining the value identifiers comprises sorting the value identifiers using a sequential identifier access pattern.

11. The system of claim 7, wherein the input data chunks comprise the row positions of a corresponding table of a column-oriented database.

12. The system of claim 11, wherein each of the value identifiers comprises an index of a dictionary of a column of the corresponding table.

13. A computer program product comprising a non-transitory machine-readable medium storing instructions that, when executed by at least one programmable processor, cause the at least one programmable processor to perform operations comprising:

receiving, at a data server associated with a database, a request to transfer data stored in a database extension layer of the database;

using a cost function to determine a configured row count limit based on a corresponding table size, processing capability, and buffer cache characteristics;

collecting input data chunks from the database extension layer for each fragment of a plurality of fragments of a generated query execution plan until the configured row count limit is reached;

grouping the input data chunks into a data group to transfer in bulk the data group;

determining row positions from the input data chunks in the data group;

determining value identifiers corresponding to the row positions;

retrieving values corresponding to the value identifiers; and generating output data based on the values corresponding to the value identifiers.

14. The computer program product of claim 13, wherein determining the value identifiers comprises sorting the row positions using a sequential access pattern.

15. The computer program product of claim 13, wherein the operations further comprise:

sorting the value identifiers to generate sorted value identifiers that are unique; and mapping the sorted value identifiers to respective rows.

16. The computer program product of claim 13, wherein determining the value identifiers comprises sorting the value identifiers using a sequential identifier access pattern.

17. The computer program product of claim 13, wherein the input data chunks comprise the row positions of a corresponding table of a column-oriented database.

18. The computer program product of claim 17, wherein each of the value identifiers comprises an index of a dictionary of a column of the corresponding table and wherein the request is received from a client machine comprising a computing system used by a user issuing the request for data transfer.

* * * * *